(12) United States Patent
Ishihara et al.

(10) Patent No.: US 12,031,291 B2
(45) Date of Patent: Jul. 9, 2024

(54) BLADE CONTROL DEVICE AND BLADE CONTROL METHOD

(71) Applicant: Komatsu Ltd., Tokyo (JP)

(72) Inventors: Takao Ishihara, Tokyo (JP); Daichi Noborio, Tokyo (JP); Yutaka Nakayama, Tokyo (JP)

(73) Assignee: Komatsu Ltd., Tokyo (JP)

( * ) Notice: Subject to any disclaimer, the term of this patent is extended or adjusted under 35 U.S.C. 154(b) by 942 days.

(21) Appl. No.: 17/044,438

(22) PCT Filed: Jan. 28, 2019

(86) PCT No.: PCT/JP2019/002787
§ 371 (c)(1),
(2) Date: Oct. 1, 2020

(87) PCT Pub. No.: WO2019/230042
PCT Pub. Date: Dec. 5, 2019

(65) Prior Publication Data
US 2021/0032841 A1 Feb. 4, 2021

(30) Foreign Application Priority Data
May 31, 2018 (JP) .................. 2018-105660

(51) Int. Cl.
*E02F 3/84* (2006.01)
*E02F 3/76* (2006.01)
(Continued)

(52) U.S. Cl.
CPC ............ *E02F 3/844* (2013.01); *E02F 3/7618* (2013.01); *E02F 9/2267* (2013.01); *E02F 9/265* (2013.01); *G01C 9/00* (2013.01)

(58) Field of Classification Search
None
See application file for complete search history.

(56) References Cited

U.S. PATENT DOCUMENTS

| | | | |
|---|---|---|---|
| 8,437,926 B2 | 5/2013 | Shintani et al. | |
| 9,014,924 B2 | 4/2015 | Edara et al. | |

(Continued)

FOREIGN PATENT DOCUMENTS

| | | |
|---|---|---|
| CN | 1179194 A | 4/1998 |
| CN | 102884253 A | 1/2013 |

(Continued)

OTHER PUBLICATIONS

International Search Report dated Sep. 4, 2019, issued for PCT/JP2019/002787.

*Primary Examiner* — Hunter B Lonsberry
*Assistant Examiner* — Paysun Wu
(74) *Attorney, Agent, or Firm* — Locke Lord LLP

(57) ABSTRACT

A blade control method includes: acquiring a design surface indicating a target shape of an excavation object to be excavated by a blade supported by a vehicle body of a work vehicle, the design surface including a first surface present in front of the work vehicle and a second surface having a slope different from a slope of the first surface; acquiring an observed pitch angle indicating an inclination angle of the vehicle body in a longitudinal direction; and calculating a planned pitching angle indicating a deviation between the observed pitch angle and a design surface pitch angle indicating an inclination angle of the second surface in a state in which the vehicle body is positioned on the first surface and the blade is positioned above the second surface.

6 Claims, 9 Drawing Sheets

(51) Int. Cl.
*E02F 9/22* (2006.01)
*E02F 9/26* (2006.01)
*G01C 9/00* (2006.01)

(56) References Cited

U.S. PATENT DOCUMENTS

| | | |
|---|---|---|
| 9,903,096 B2 | 2/2018 | Noborio et al. |
| 11,180,902 B2 * | 11/2021 | Christofferson ........ E02F 3/847 |
| 2006/0070746 A1 * | 4/2006 | Lumpkins ................ E02F 3/844 |
| | | 172/2 |
| 2010/0299031 A1 * | 11/2010 | Zhdanov .................. E02F 3/845 |
| | | 701/50 |
| 2013/0000930 A1 | 1/2013 | Shintani et al. |
| 2016/0122969 A1 * | 5/2016 | Noborio .................. E02F 9/262 |
| | | 701/50 |
| 2016/0201298 A1 | 7/2016 | Taylor et al. |
| 2018/0038082 A1 | 2/2018 | Hashimoto et al. |
| 2019/0078296 A1 | 3/2019 | Ishibashi et al. |
| 2019/0194912 A1 | 6/2019 | Ishibashi et al. |

FOREIGN PATENT DOCUMENTS

| | | |
|---|---|---|
| JP | S63-103135 A | 5/1988 |
| JP | 2018-016970 A | 2/2018 |
| JP | 2018-021348 A | 2/2018 |
| JP | 2018-021427 A | 2/2018 |
| JP | 2018-071256 A | 5/2018 |
| WO | 2008/118027 A2 | 10/2008 |
| WO | 2015/083469 A1 | 6/2015 |

* cited by examiner

[ESTIMATION TABLE]

[CORRECTION TABLE]

BLADE CONTROL DEVICE AND BLADE CONTROL METHOD

FIELD

The present invention relates to a blade control device and a blade control method.

BACKGROUND

A work vehicle having a blade is used for excavation of an excavation object or for leveling. A work vehicle that causes a blade to follow a design surface has been proposed. The design surface refers to a target shape of the excavation object.

CITATION LIST

Patent Literature

Patent Literature 1: International Publication No. WO 2015/083469

SUMMARY

Technical Problem

The blade is driven by a hydraulic system. The hydraulic system is driven based on a control command output from a blade control device. The design surface may be composed of a plurality of surfaces having different slopes. If a control delay occurs when the blade passes a boundary between surfaces having different slopes, the blade may fail to follow the design surface. As a result, the blade may excavate the excavation object beyond the design surface, and the excavation object may not be excavated into a desired shape.

It is an object of an aspect of the present invention to excavate the excavation object into a desired shape.

Solution to Problem

According to an aspect of the present invention, a blade control device comprises: a design surface acquisition unit that acquires a design surface indicating a target shape of an excavation object to be excavated by a blade supported by a vehicle body of a work vehicle, the design surface including a first surface present in front of the work vehicle and a second surface having a slope different from a slope of the first surface; a vehicle body angle acquisition unit that acquires an observed pitch angle indicating an inclination angle of the vehicle body in a longitudinal direction; a planned pitching angle calculation unit that, in a state in which at least a part of the vehicle body is positioned on the first surface and the blade is positioned above the second surface, calculates a planned pitching angle indicating a deviation between the observed pitch angle and a design surface pitch angle indicating an inclination angle of the second surface; a corrected pitch angle calculation unit that corrects the observed pitch angle based on the planned pitching angle and calculates a corrected pitch angle of the vehicle body; and a target cylinder speed calculation unit that, based on the corrected pitch angle, calculates a target cylinder speed of a hydraulic cylinder that adjusts a height of the blade.

Advantageous Effects of Invention

According to the aspect of the present invention, the excavation object can be excavated into a desired shape.

DESCRIPTION OF EMBODIMENTS

Figure 1:
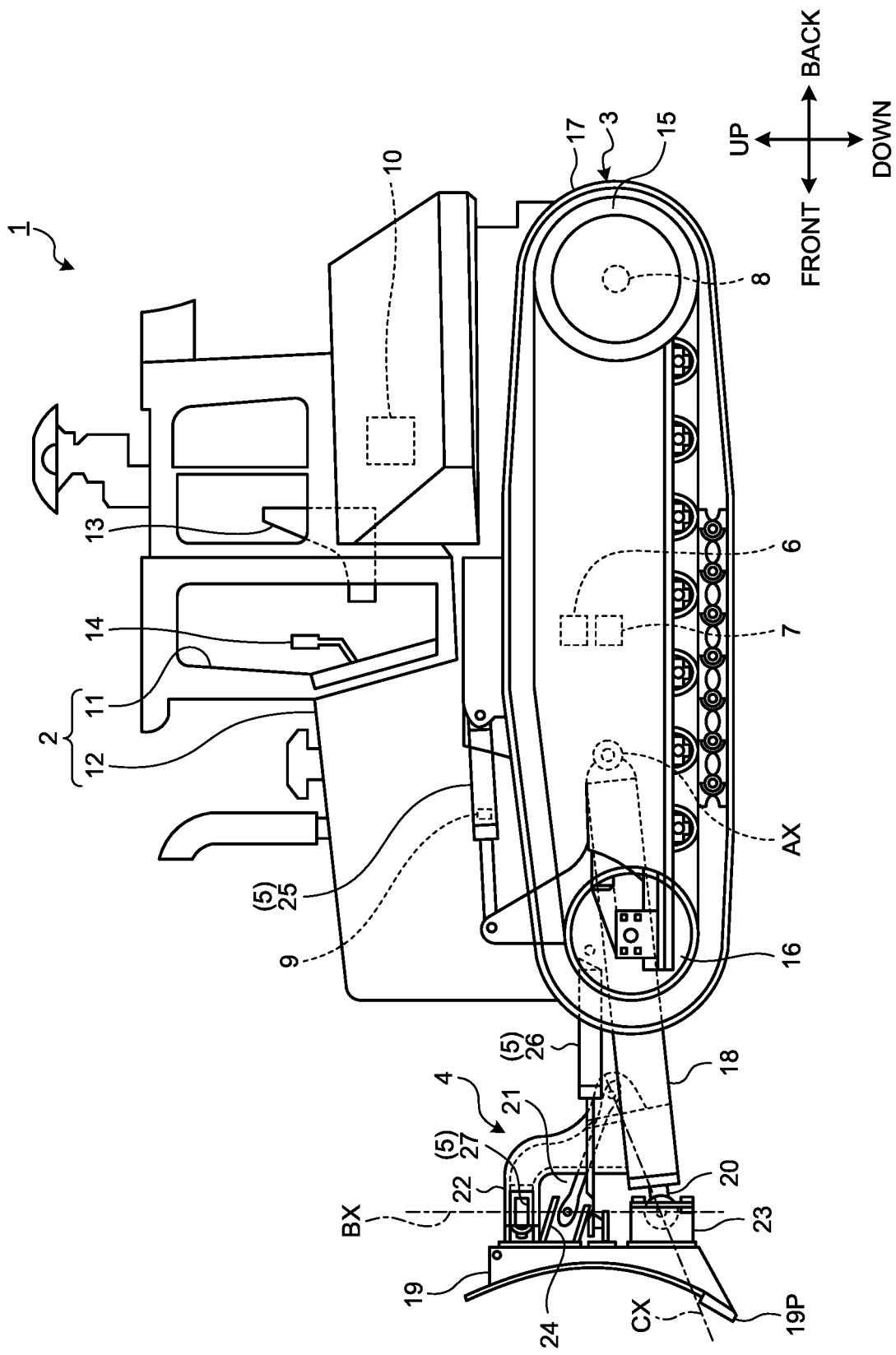
FIG. 1 is a view illustrating a work vehicle according to the present embodiment.

Hereinafter, embodiments according to the present invention will be described with reference to the drawings; however, the present invention is not limited thereto. Components of the embodiments to be described below can be appropriately combined with one another. In some cases, some components are not used.

In the following description, a global coordinate system and a local coordinate system are defined, and positional relationships between respective portions will be described. The global coordinate system refers to a coordinate system that takes as a reference an origin fixed to the earth. The global coordinate system is a coordinate system defined by a global navigation satellite system (GNSS). The GNSS is a global navigation satellite system. As an example of the global navigation satellite system, mentioned is a global positioning system (GPS). The GNSS includes a plurality of positioning satellites. The GNSS detects a position defined by coordinate data of latitude, longitude, and altitude. The local coordinate system refers to a coordinate system that takes as a reference an origin fixed to a vehicle body 2 of a work vehicle 1. In the local coordinate system, the vertical direction, the horizontal direction, and the longitudinal direction are defined. As will be described later, the work vehicle 1 includes the vehicle body 2 provided with a seat 13 and an operation device 14, and travel devices 3 each of which includes a drive wheel 15 and a crawler belt 17. The vertical direction refers to a direction perpendicular to a ground contact surface of the crawler belt 17. The horizontal direction is a direction parallel to a rotation axis of the drive wheel 15. The horizontal direction is synonymous with a vehicle width direction of the work vehicle 1. The longitudinal direction is a direction perpendicular to the horizontal direction and the vertical direction.

An upper side refers to one direction in the vertical direction, and refers to a direction away from the ground contact surface of the crawler belt 17. A lower side refers to a direction opposite to the upper side in the vertical direction, and refers to a direction approaching the ground contact surface of the crawler belt 17. A left side refers to one direction in the horizontal direction, and refers to a left side direction while taking as a reference an operator of the work vehicle 1, who is seated on the seat 13 so as to face the operation device 14. A right side refers to a direction opposite to the left side in the horizontal direction, and refers to a right-side direction while taking as a reference the operator of the work vehicle 1, who is seated on the seat 13. A front side refers to one direction in the longitudinal direction, and refers to a direction from the seat 13 toward the operation device 14. A rear side refers to a direction opposite to the front side in the longitudinal direction, and refers to a direction from the operation device 14 toward the seat 13.

Moreover, an upper portion refers to an upper side portion of a member or a space in the vertical direction, and refers to a portion separated from the ground contact surface of the crawler belt 17. A lower portion refers to a lower side portion of the member or the space in the vertical direction, and refers to a portion close to the ground contact surface of the crawler belt 17. A left portion refers to a left side portion of the member or the space when the operator of the work vehicle 1, who is seated on the seat 13, is taken as a reference. A right portion refers to a right-side portion of the member or the space when the operator of the work vehicle 1, who is seated on the seat 13, is taken as a reference. A front portion refers to a portion on a front side of the member or the space in the longitudinal direction. A rear portion refers to a portion on a rear side of the member or the space in the longitudinal direction.

[Work Vehicle]

Figure 2:
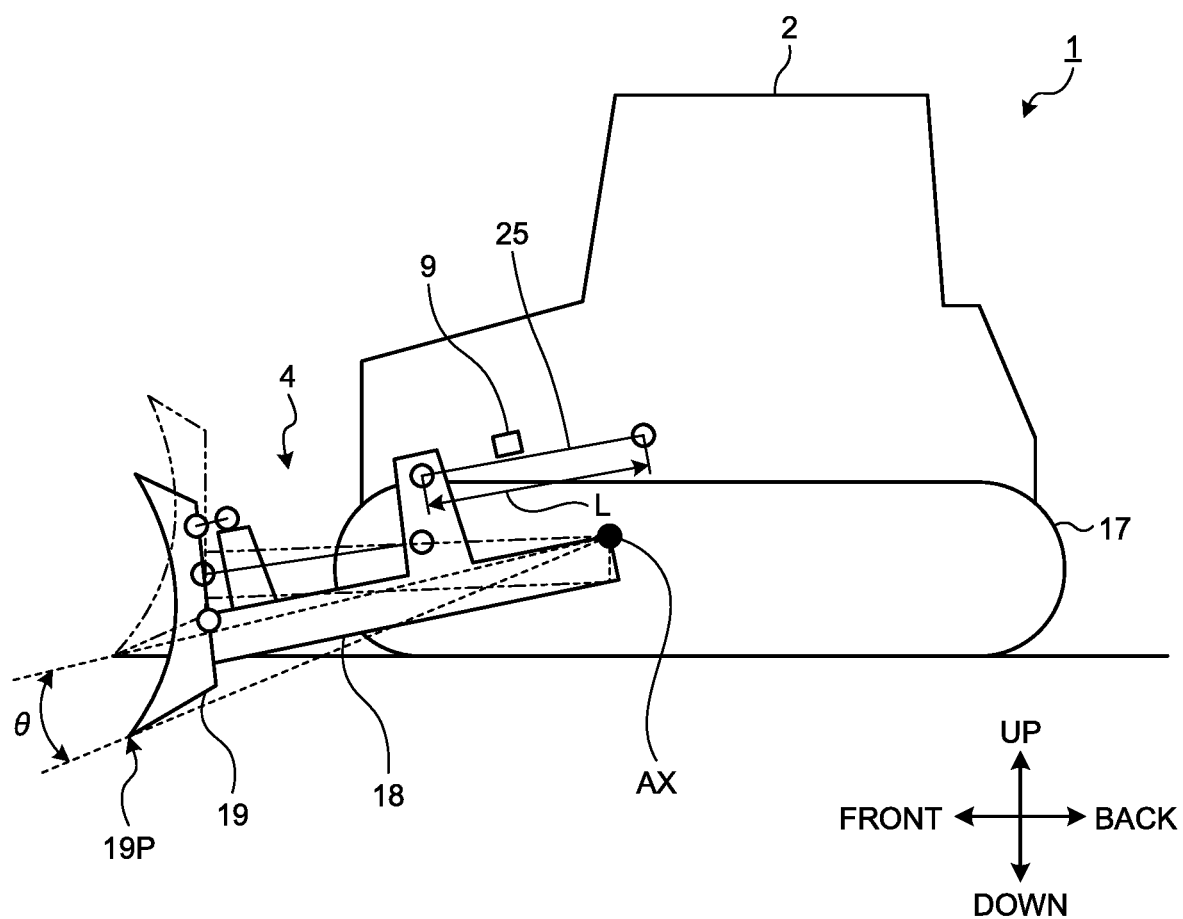
FIG. 2 is a view schematically illustrating the work vehicle according to the present embodiment.

FIG. 1 is a view illustrating the work vehicle 1 according to the present embodiment. FIG. 2 is a view schematically illustrating the work vehicle 1 according to the present embodiment. In the present embodiment, the work vehicle 1 is defined as a bulldozer. The work vehicle 1 includes the vehicle body 2, the travel devices 3, working equipment 4, a hydraulic cylinder 5, a position sensor 6, an inclination sensor 7, a speed sensor 8, an operation amount sensor 9, and a blade control device 10.

The vehicle body 2 includes an operator's cab 11 and an engine compartment 12. The engine compartment 12 is disposed in front of the operator's cab 11. In the operator's cab 11, the seat 13 on which an operator is seated and the operation device 14 operated by the operator are disposed. The operation device 14 includes an operation lever for operating the working equipment 4 and a travel lever for operating the travel device 3.

The travel devices 3 support the vehicle body 2. Each of the travel devices 3 includes the drive wheel 15 called a sprocket, an idler wheel 16 called an idler, and the crawler belt 17 supported by the drive wheel 15 and the idler wheel 16. The idler wheel 16 is disposed in front of the drive wheel 15. The drive wheel 15 is driven by power generated by a drive source such as a hydraulic motor. The drive wheel 15 is rotated by operating the travel lever of the operation device 14. The work vehicle 1 travels in such a manner that the drive wheel 15 is rotated to rotate the crawler belt 17.

The working equipment 4 is movably supported by the vehicle body 2. The working equipment 4 includes a lift frame 18 and a blade 19.

The lift frame 18 is supported by the vehicle body 2 so as to be vertically rotatable about a rotation axis AX extending in the vehicle width direction. The lift frame 18 supports the blade 19 via a ball joint portion 20, a pitch support link 21, and a support portion 22.

The blade 19 is disposed in front of the vehicle body 2. The blade 19 includes a universal joint 23 that contacts the ball joint portion 20, and a pitching joint 24 that contacts the pitch support link 21. The blade 19 is movably supported by the vehicle body 2 via the lift frame 18. The blade 19 moves in the vertical direction in conjunction with a vertical rotational movement of the lift frame 18.

The blade 19 has a cutting edge 19P. The cutting edge 19P is disposed at a lower end of the blade 19. In excavation work or leveling work, the cutting edge 19P excavates an excavation object.

The hydraulic cylinder 5 generates power to move the working equipment 4. The hydraulic cylinder 5 includes a lift cylinder 25, an angle cylinder 26, and a tilt cylinder 27.

The lift cylinder 25 is a hydraulic cylinder 5 able to move the blade 19 in the vertical direction (lift direction). The lift cylinder 25 is able to adjust a height of the blade 19, which indicates a position of the blade 19 in the vertical direction. The lift cylinder 25 is coupled to each of the vehicle body 2 and the lift frame 18. The lift cylinder 25 expands and contracts, whereby the lift frame 18 and the blade 19 move in the vertical direction about the rotation axis AX.

The angle cylinder 26 is the hydraulic cylinder 5 able to move the blade 19 in a rotation direction (angle direction). The angle cylinder 26 is coupled to each of the lift frame 18 and the blade 19. The angle cylinder 26 expands and contracts, whereby the blade 19 rotates about a rotation axis BX. The rotation axis BX passes through a rotation axis of the universal joint 23 and a rotation axis of the pitching joint 24.

The tilt cylinder 27 is the hydraulic cylinder 5 able to move the blade 19 in a rotation direction (tilt direction). The tilt cylinder 27 is coupled to the support portion 22 of the lift frame 18 and an upper right end of the blade 19. The tilt cylinder 27 expands and contracts, whereby the blade 19 rotates about a rotation axis CX. The rotation axis CX passes through the ball joint portion 20 and a lower end of the pitch support link 21.

The position sensor 6 detects a position of the vehicle body 2 of the work vehicle 1. The position sensor 6 includes a GPS receiver, and detects a position of the vehicle body 2 in the global coordinate system. Detection data of the position sensor 6 includes vehicle body position data indicating an absolute position of the vehicle body 2.

The inclination sensor 7 detects an inclination angle of the vehicle body 2 with respect to a horizontal plane. Detection data of the inclination sensor 7 includes vehicle body angle data indicating the inclination angle of the vehicle body 2. The inclination sensor 7 includes an inertial measurement unit (IMU).

The speed sensor 8 detects a travel speed of the travel device 3. Detection data of the speed sensor 8 includes travel speed data indicating the travel speed of the travel device 3.

The operation amount sensor 9 detects an operation amount of the hydraulic cylinder 5. The operation amount of the hydraulic cylinder 5 includes a stroke length of the hydraulic cylinder 5. Detection data of the operation amount sensor 9 includes operation amount data indicating the operation amount of the hydraulic cylinder 5. The operation amount sensor 9 includes a rotating roller that detects a position of a rod of the hydraulic cylinder 5, and a magnetic force sensor that returns the position of the rod to an origin thereof. The operation amount sensor 9 may be an angle sensor that detects an inclination angle of the working equipment 4. Moreover, the operation amount sensor 9 may be an angle sensor that detects a rotation angle of the hydraulic cylinder 5.

The operation amount sensor 9 is provided in each of the lift cylinder 25, the angle cylinder 26, and the tilt cylinder 27. The operation amount sensor 9 detects a stroke length of the lift cylinder 25, a stroke length of the angle cylinder 26, and a stroke length of the tilt cylinder 27.

As illustrated in FIG. 2, the lift angle θ of the blade 19 is calculated based on the stroke length L of the lift cylinder 25. The lift angle θ refers to a descending angle of the blade 19 from an initial position of the working equipment 4. As indicated by a chain double-dashed line in FIG. 2, the initial position of the working equipment 4 refers to a position of the working equipment 4 when the cutting edge 19P of the blade 19 contacts a predetermined surface parallel to the ground contact surface of the crawler belt 17. The lift angle θ corresponds to a distance (penetration depth) between the predetermined surface and the cutting edge 19P disposed below the predetermined surface. The work vehicle 1 moves forward in a state in which the cutting edge 19P of the blade 19 is disposed below the predetermined surface, whereby the excavation work or the leveling work by the blade 19 is implemented.

[Blade Control Device]

Figure 3:
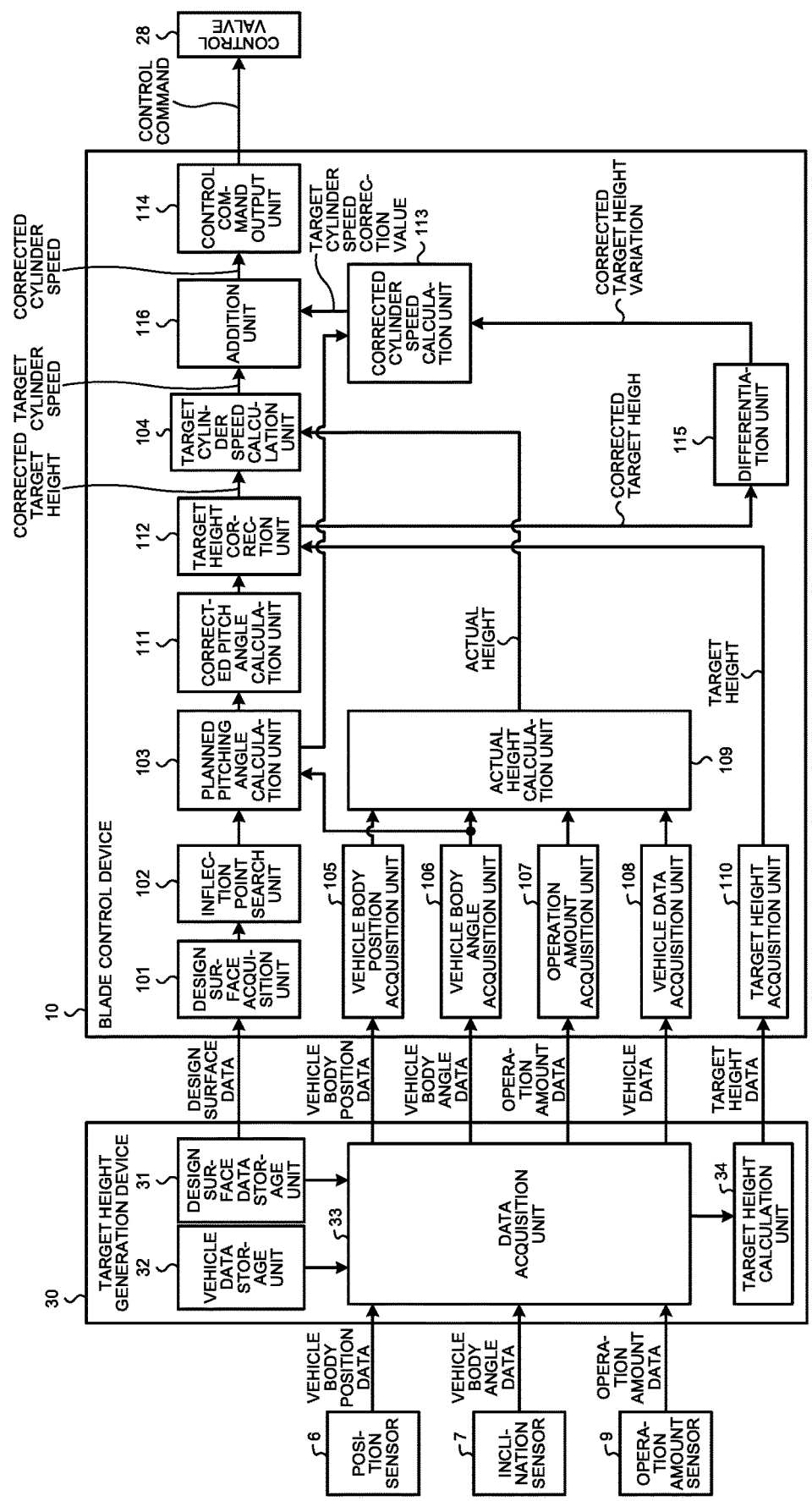
FIG. 3 is a functional block diagram illustrating a blade control device according to the present embodiment.

FIG. 3 is a functional block diagram illustrating the blade control device 10 according to the present embodiment. The blade control device 10 includes a computer system. A target height generation device 30 is connected to the blade control device 10. The target height generation device 30 includes a computer system.

The blade control device 10 controls the height of the cutting edge 19P of the blade 19. The blade control device 10 controls the height of the cutting edge 19P by controlling the lift cylinder 25 able to move the blade 19 in the vertical direction.

The work vehicle 1 includes a control valve 28 that controls a flow rate and direction of the hydraulic oil supplied to the lift cylinder 25. The blade control device 10 controls the height of the cutting edge 19P by controlling the control valve 28.

The control valve 28 includes a proportional control valve. The control valve 28 is disposed in an oil passage between the lift cylinder 25 and a hydraulic pump (not illustrated) that discharges hydraulic oil for driving the blade 19. The hydraulic pump supplies the hydraulic oil to the lift cylinder 25 via the control valve 28. The lift cylinder 25 is driven based on the hydraulic oil controlled by the control valve 28.

The target height generation device 30 generates target height data, which indicates the target height of the cutting edge 19P of the blade 19, based on a design surface IS indicating a target shape of the excavation object. The target height of the cutting edge 19P refers to a position of the cutting edge 19P, where the cutting edge 19P can be matched with the design surface IS in the local coordinate system.

<Target Height Generation Device>

The target height generation device 30 includes a design surface data storage unit 31, a vehicle data storage unit 32, a data acquisition unit 33, and a target height calculation unit 34.

The design surface data storage unit 31 stores design surface data indicating the design surface IS that is the target shape of the excavation object to be excavated by the blade 19. The design surface IS includes three-dimensional shape data indicating the target shape of the excavation object. The design surface IS includes computer aided design (CAD) data created, for example, based on the target shape of the excavation object, and is stored in the design surface data storage unit 31 in advance.

The design surface data may be transmitted from the outside of the work vehicle 1 to the target height generation device 30 via a communication line.

The vehicle data storage unit 32 stores vehicle data indicating dimensions and shape of the work vehicle 1. The dimensions of the work vehicle 1 include dimensions of the lift frame 18 and dimensions of the blade 19. The shape of the work vehicle 1 includes the shape of the blade 19. The vehicle data is known data derivable from design data or specification data of the work vehicle 1, and is stored in the vehicle data storage unit 32 in advance.

The data acquisition unit 33 acquires vehicle body position data, which indicates the absolute position of the vehicle body 2, from the position sensor 6. The data acquisition unit 33 acquires vehicle body angle data, which indicates the inclination angle of the vehicle body 2, from the inclination sensor 7. The data acquisition unit 33 acquires the operation amount data, which indicates the stroke length of the lift cylinder 25, from the operation amount sensor 9.

The data acquisition unit 33 acquires the design surface data, which indicating the design surface IS, from the design surface data storage unit 31. The data acquisition unit 33 acquires the vehicle data, which indicates the dimensions and shape of the work vehicle 1, from the vehicle data storage unit 32.

The target height calculation unit 34 calculates the target height of the cutting edge 19P based on the vehicle body position data, the vehicle body angle data, the operation amount data, the vehicle data, and the design surface data.

Figure 4:
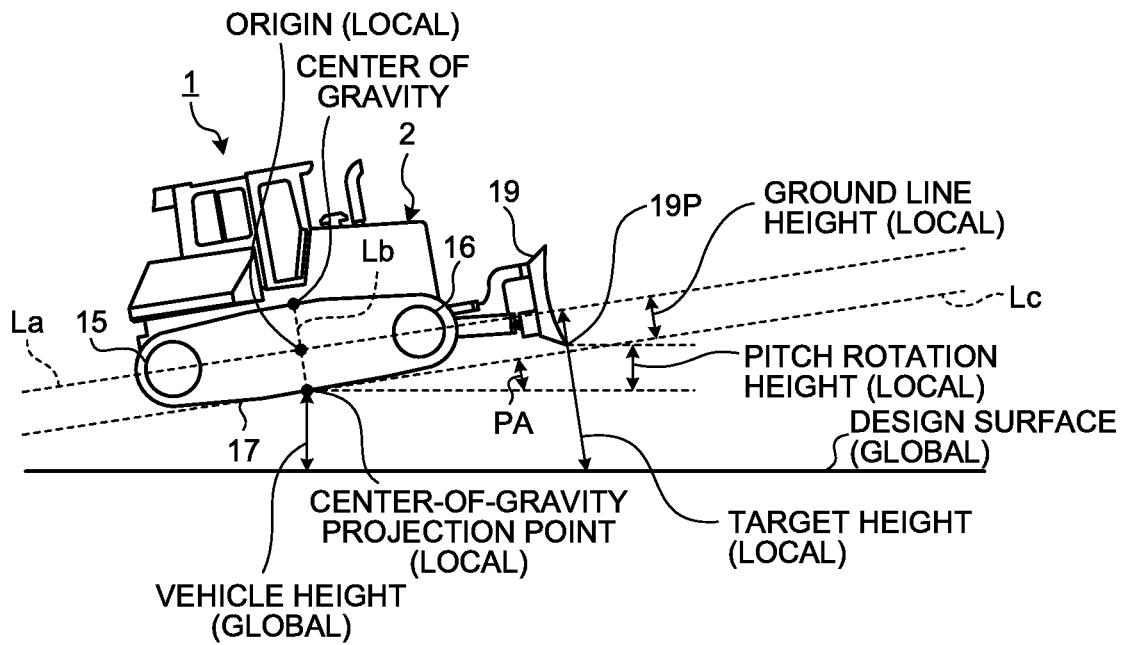
FIG. 4 is a view for explaining calculation processing of a target height by a target height calculation unit according to the present embodiment.

FIG. 4 is a view for explaining calculation processing of the target height by the target height calculation unit 34 according to the present embodiment. The design surface IS is defined in the global coordinate system. The target height of the cutting edge 19P is specified in the local coordinate system.

As illustrated in FIG. 4, the origin of the local coordinate system is defined on a line La that passes through the rotation axis of the idler wheel 16 and extends in the longitudinal direction. The origin of the local coordinate system is the intersection of the line La and a perpendicular Lb that passes through the center of gravity of the vehicle body 2 and is perpendicular to the line La. Further, the position sensor 6 detects a vehicle body height indicating a height of the vehicle body 2 in the global coordinate system. In the present embodiment, the vehicle body height is a height of a center-of-gravity projection point indicating an intersection of the perpendicular Lb and the ground contact surface of the crawler belt 17. A line Lc that passes through the center-of-gravity projection point and extends in the longitudinal direction is defined.

The vehicle body height is calculated based on the vehicle data and the vehicle body position data detected by the position sensor 6. A ground line height is defined in the local coordinate system. The ground line height refers to a distance between the line La and the line Lc in the vertical direction of the local coordinate system.

When the lift cylinder 25 is driven, the position of the cutting edge 19P changes in conjunction with the drive of the lift cylinder 25. Further, when the vehicle body 2 inclines, the position of the cutting edge 19P changes in conjunction with the inclination of the vehicle body 2. A pitch rotation height is defined in the local coordinate system. The pitch rotation height refers to a height of the cutting edge 19P, which changes in conjunction with the inclination of the vehicle body 2. When the inclination angle of the vehicle body 2 in the longitudinal direction is a pitch angle PA, and a distance between the cutting edge 19P and the center-of-gravity projection point in the longitudinal direction is W, the pitch rotation height is represented by [W×sin(PA)].

The target height is represented by a length of a line segment that is perpendicular to the line La, passes through the cutting edge 19P, and intersects the design surface. In the present embodiment, the target height is approximately represented as the sum of the vehicle body height, the ground line height, and the pitch rotation height.

As described above, the target height calculation unit 34 calculates the target height of the cutting edge 19P based on the vehicle body position data, the vehicle body angle data including the pitch angle PA, the vehicle data, the operation amount data, and the design surface data.

The pitch angle PA, which indicates the inclination angle of the vehicle body 2 in the longitudinal direction, is detected by the inclination sensor 7. In the following description, the inclination angle of the vehicle body 2 in the longitudinal direction, which is detected by the inclination sensor 7, is appropriately referred to as an observed pitch angle PA. The inclination sensor 7 can also detect an inclination angle of the vehicle body 2 in the vehicle width direction.

<Blade Control Device>

The blade control device 10 includes a design surface acquisition unit 101, an inflection position search unit 102, a planned pitching angle calculation unit 103, a target cylinder speed calculation unit 104, a vehicle body position acquisition unit 105, and a vehicle body angle acquisition unit 106, an operation amount acquisition unit 107, a vehicle data acquisition unit 108, an actual height calculation unit 109, a target height acquisition unit 110, a corrected pitch angle calculation unit 111, a target height correction unit 112, a differentiation unit 115, a corrected cylinder speed calculation unit 113, an addition unit 116, and a control command output unit 114.

The design surface acquisition unit 101 acquires the design surface data, which indicating the design surface IS, from the design surface data storage unit 31.

The inflection position search unit 102 searches for an inflection position CP indicating a boundary between a first surface F1 and a second surface F2, which is present in front of the work vehicle 1 on the design surface IS.

Figure 5:
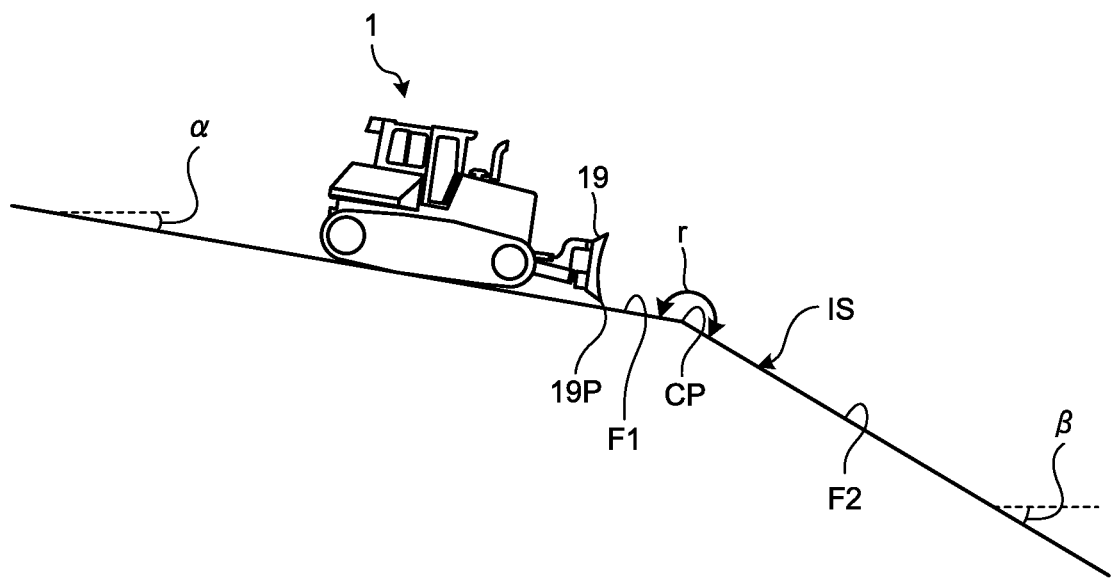
FIG. 5 is a view schematically illustrating a design surface according to the present embodiment.

FIG. 5 is a view schematically illustrating the design surface IS according to the present embodiment. The design surface IS may be composed of a plurality of surfaces having different slopes. In the example illustrated in FIG. 5, the design surface IS includes the first surface F1 present in front of the work vehicle 1 and the second surface F2 having a slope different from that of the first surface F1. The first surface F1 of the design surface IS is present in front of the work vehicle 1, and the second surface F2 is present in front of the first surface F1. The slope of the first surface F1 and the slope of the second surface F2 are different from each other. An inclination angle α of the first surface F1 with respect to the horizontal plane is smaller than an inclination angle β of the second surface F2 with respect to the horizontal plane. On the design surface IS, an angle γ formed of the first surface F1 and the second surface F2 is larger than 180 [°].

In the example illustrated in FIG. 5, the first surface F1 is inclined downward toward the front of the work vehicle 1. The second surface F2 is inclined downward toward the front of the work vehicle 1. The first surface F1 is connected to an uppermost portion of the second surface F2. The uppermost portion of the second surface F2 is the top of slope.

The inflection position search unit 102 can search for the inflection position CP, which indicates the boundary between the first surface F1 and the second surface F2, based on the design surface data acquired by the design surface acquisition unit 101.

The inflection position search unit 102 may search for the inflection position CP in a two-dimensional plane or may search for the inflection position CP in a three-dimensional space. When searching for the inflection position CP in the two-dimensional plane, the inflection position search unit 102 searches for an intersection of the first surface F1 and the second surface F2 on an intersection line of the design surface IS and a surface passing through the cutting edge 19P and extending in the longitudinal direction in the local coordinate system, and can thereby specify the inflection position CP. When searching for the inflection position CP in the three-dimensional space, the inflection position search unit 102 can specify the inflection position CP based on a state of change of height data of the design surface IS, which is present in front of the vehicle body 2, with respect to the vehicle body 2.

In the following description, an inclination angle β of the second surface F2 with respect to the horizontal plane will be appropriately referred to as a design surface pitch angle β. The inflection position search unit 102 can specify the position of the inflection position CP and the design surface pitch angle β of the second surface F2 based on the design surface data acquired by the design surface acquisition unit 101.

The vehicle body position acquisition unit 105 acquires the vehicle body position data, which indicates the position of the vehicle body 2, from the data acquisition unit 33.

The vehicle body angle acquisition unit 106 acquires the vehicle body angle data, which indicates the inclination angle of the vehicle body 2, from the data acquisition unit 33. As mentioned above, the inclination angle of the vehicle body 2 includes the observed pitch angle PA indicating the inclination angle of the vehicle body 2 in the longitudinal direction. The vehicle body angle acquisition unit 106 acquires the observed pitch angle PA of the vehicle body 2, which is detected by the inclination sensor 7, from the data acquisition unit 33.

The operation amount acquisition unit 107 acquires the operation amount data, which indicates the operation amount of the lift cylinder 25 able to move the blade 19, from the data acquisition unit 33.

The vehicle data acquisition unit 108 acquires the vehicle data, which indicates the dimensions and shape of the work vehicle 1, from the data acquisition unit 33.

The actual height calculation unit 109 calculates an actual height, which indicates an actual height of the cutting edge 19P of the blade 19 in the local coordinate system, based on the vehicle body position data, the vehicle body angle data, the operation amount data, and the vehicle data.

The actual height calculation unit 109 calculates the lift angle θ of the blade 19 based on the operation amount data. The actual height calculation unit 109 calculates the height of the cutting edge 19P of the blade 19 in the local coordinate system based on the lift angle θ and the vehicle data. Further, the actual height calculation unit 109 can calculate the height of the cutting edge 19P of the blade 19 in the global coordinate system based on the origin of the local coordinate system and the vehicle body position data.

The target height acquisition unit 110 acquires a target height of the cutting edge 19P of the blade 19, which is calculated based on the design surface IS in the target height calculation unit 34, from the target height calculation unit 34.

The planned pitching angle calculation unit 103 calculates a planned pitching angle δ, which indicates a deviation between the observed pitch angle PA of the vehicle body 2 and the design surface pitch angle β of the second surface F2, in a state in which at least a part of the vehicle body 2 is positioned on the first surface F1 and the blade 19 is positioned above the second surface F2.

Figure 6:
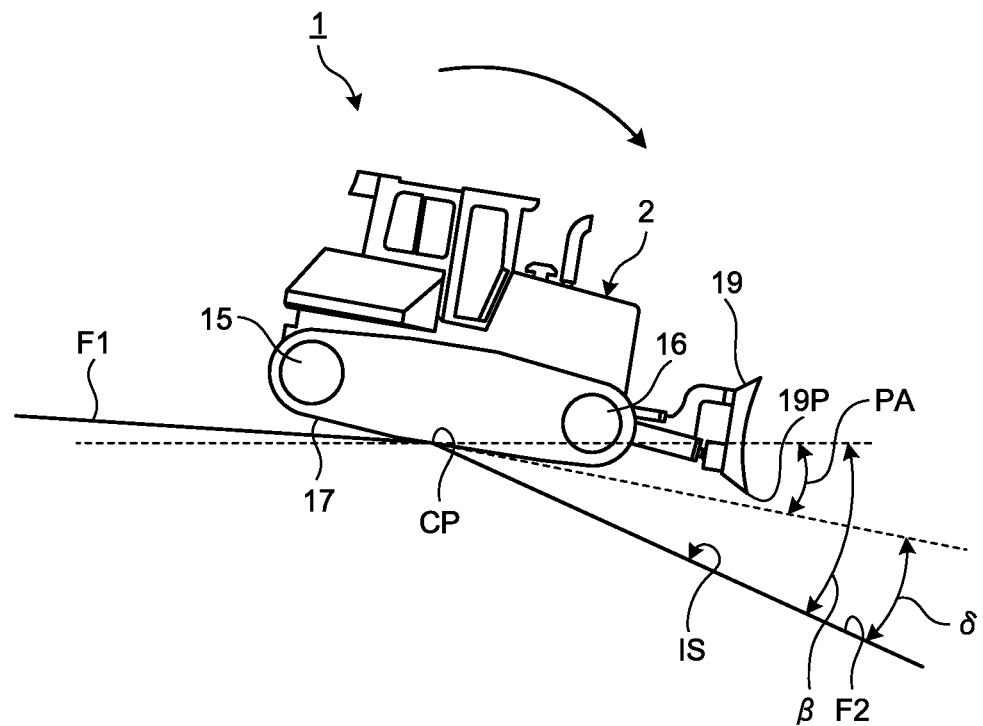
FIG. 6 is a view for explaining a planned pitching angle according to the present embodiment.

FIG. 6 is a view for explaining the planned pitching angle δ according to the present embodiment. As illustrated in FIG. 6, the planned pitching angle δ refers to the deviation between the observed pitch angle PA of the vehicle body 2 with respect to the horizontal plane and the design surface pitch angle β of the second surface F2 with respect to the horizontal plane.

The planned pitching angle calculation unit 103 calculates the planned pitching angle δ based on the inflection position CP. For example, when the work vehicle 1 moves forward on the first surface F1 and the center-of-gravity projection point of the work vehicle 1 passes the inflection position CP, the posture of the vehicle body 2 may be changed so as to fall forward by the action of gravity until the ground contact surface of the crawler belt 17 contacts the second surface F2. The planned pitching angle δ indicates a variation of the inclination angle of the vehicle body 2 in the longitudinal direction, the variation being predicted when the posture of the vehicle body 2 falls forward after the center-of-gravity projection point of the work vehicle 1 passes the inflection position CP.

In the present embodiment, the planned pitching angle calculation unit 103 starts calculation of the planned pitching angle δ when the idler wheels 16 of the work vehicle 1 moving forward on the first surface F1 pass the inflection position CP. The planned pitching angle calculation unit 103 can determine whether or not the idler wheels 16 of the work vehicle 1 moving forward on the first surface F1 have passed the inflection position CP based on the vehicle data and the vehicle body position data detected by the position sensor 6.

The corrected pitch angle calculation unit 111 corrects the observed pitch angle PA of the vehicle body 2 based on the planned pitching angle δ calculated by the planned pitching angle calculation unit 103, and calculates a corrected pitch angle PAc of the vehicle body 2.

As mentioned above, the target height acquisition unit 110 acquires the target height of the cutting edge 19P from the target height calculation unit 34. The target height calculation unit 34 calculates the target height of the cutting edge 19P based on the vehicle body position data, the vehicle body angle data including the pitch angle PA, the vehicle data, the operation amount data, and the design surface data. For example, due to a data transmission delay or the like, a time lag may occur between the point of time when the inclination sensor 7 detects the observed pitch angle PA and the point of time when the vehicle body angle acquisition unit 106 acquires the observed pitch angle PA. When the time lag occurs, an error may occur between the observed pitch angle PA acquired by the vehicle body angle acquisition unit 106 and a true pitch angle PAr at the point of time when the vehicle body angle acquisition unit 106 acquires the observed pitch angle PA. The true pitch angle PAr is an actual pitch angle of the vehicle body 2. As described above, due to the time lag, the vehicle body angle acquisition unit 106 may acquire the observed pitch angle PA delayed from the true pitch angle PAr and showing a value different from the true pitch angle PAr.

In the present embodiment, the corrected pitch angle calculation unit 111 estimates the delay time of the observed pitch angle PA with respect to the true pitch angle PAr based on the planned pitching angle δ calculated by the planned pitching angle calculation unit 103 and an estimation table stored in advance. The delay time of the observed pitch angle PA with respect to the true pitch angle PAr refers to a time lag between a point of time when the inclination sensor 7 detects the observed pitch angle PA and a point of time when the vehicle body angle acquisition unit 106 acquires the observed pitch angle data indicating the observed pitch angle PA.

Figure 7:
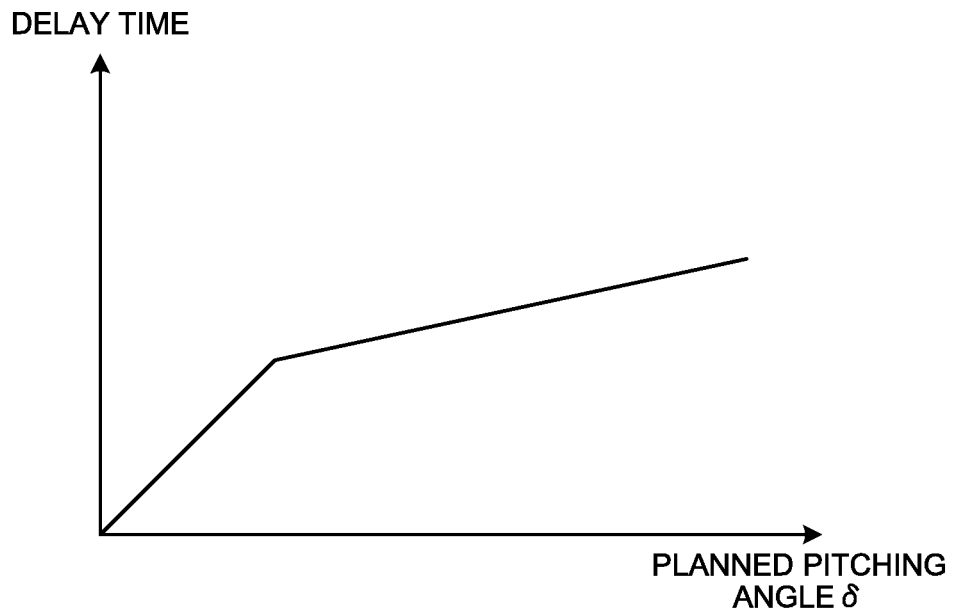
FIG. 7 is a diagram illustrating an estimation table according to the present embodiment.

FIG. 7 is a diagram illustrating the estimation table according to the present embodiment. The estimation table includes correlation data indicating a relationship between the planned pitching angle δ and the delay time of the observed pitch angle PA with respect to the true pitch angle PAr. The estimation table is predetermined by preliminary experiments or simulations and is stored in the corrected pitch angle calculation unit 111. As illustrated in FIG. 7, the delay time increases as the planned pitching angle δ is larger. The delay time decreases as the planned pitching angle δ is smaller.

The corrected pitch angle calculation unit 111 estimates the delay time of the observed pitch angle PA with respect to the true pitch angle PAr based on the planned pitching angle δ calculated by the planned pitching angle calculation unit 103 and such an estimation table as illustrated in FIG. 7.

The corrected pitch angle calculation unit 111 calculates an observed pitch angular velocity PAv of the vehicle body 2 based on a variation of the observed pitch angle PA per unit time. The corrected pitch angle calculation unit 111 calculates the observed pitch angular velocity PAv of the vehicle body 2 by differentiating the observed pitch angle PA.

The corrected pitch angle calculation unit 111 estimates the true pitch angle PAr based on the delay time and the observed pitch angular velocity PAv, and calculates the error between the true pitch angle PAr and the observed pitch angle PA. The corrected pitch angle calculation unit 111 calculates the corrected pitch angle PAc based on the error between the true pitch angle PAr and the observed pitch angle PA and based on the observed pitch angle PA. The corrected pitch angle PAc corresponds to the true pitch angle PAr.

Based on the corrected pitch angle PAc calculated by the corrected pitch angle calculation unit 111, the target height correction unit 112 corrects the target height of the cutting edge 19P, which is acquired by the target height acquisition unit 110, and generates a corrected target height of the cutting edge 19P of the blade 19. The corrected target height of the cutting edge 19P refers to a position of the cutting edge 19P, where the cutting edge 19P can be matched with the second surface F2 of the design surface IS in the local coordinate system.

As mentioned above, the target height calculation unit 34 calculates the target height of the cutting edge 19P based on the observed pitch angle data and the like. For example, due to a computation delay, the data transmission delay or the like, a time lag may occur between a point of time when the target height calculation unit 34 calculates the pitch rotation height based on the observed pitch angle data, a point of time when the target height calculation unit 34 calculates the target height of the cutting edge 19P based on the pitch rotation height, and a point of time when the target height acquisition unit 110 acquires the target height. When the time lag occurs, an error occurs between the target height of the cutting edge 19P, which is acquired by the target height acquisition unit 110, and a target height that should be truly referred to at the point of time when the target height acquisition unit 110 acquires the target height. As described above, due to the time lag, the target height acquisition unit 110 may acquire such a target height showing a value different from the target height that should be truly referred to, such a target height being delayed from the target height that should be truly referred to.

In the present embodiment, the target height correction unit 112 corrects the target height of the cutting edge 19P, which is acquired by the target height acquisition unit 110, based on the corrected pitch angle PAc corrected in consideration of the delay time, and generates the corrected target height that should be truly referred to. The corrected target height shows a value higher than the target height.

The target cylinder speed calculation unit 104 calculates a target cylinder speed of the lift cylinder 25, which adjusts the height of the cutting edge 19P of the blade 19, based on the corrected pitch angle PAc. The target cylinder speed calculation unit 104 calculates the target cylinder speed of the lift cylinder 25 based on the corrected target height calculated based on the corrected pitch angle PAc.

The target cylinder speed calculation unit 104 calculates the target cylinder speed so that a deviation between the height of the cutting edge 19P of the blade 19, which is calculated by the actual height calculation unit 109, and the corrected target height generated by the target height correction unit 112 becomes small.

The differentiation unit 115 calculates a corrected target height variation based on the corrected target height of the cutting edge 19P, which is generated by the target height correction unit 112.

The corrected cylinder speed calculation unit 113 calculates a target cylinder speed correction value based on the planned pitching angle δ and the corrected target height variation calculated by the differentiation unit 115.

In the present embodiment, the corrected cylinder speed calculation unit 113 calculates the target cylinder speed correction value based on the planned pitching angle δ calculated by the planned pitching angle calculation unit 103 and based on a correction table stored in advance.

Figure 8:
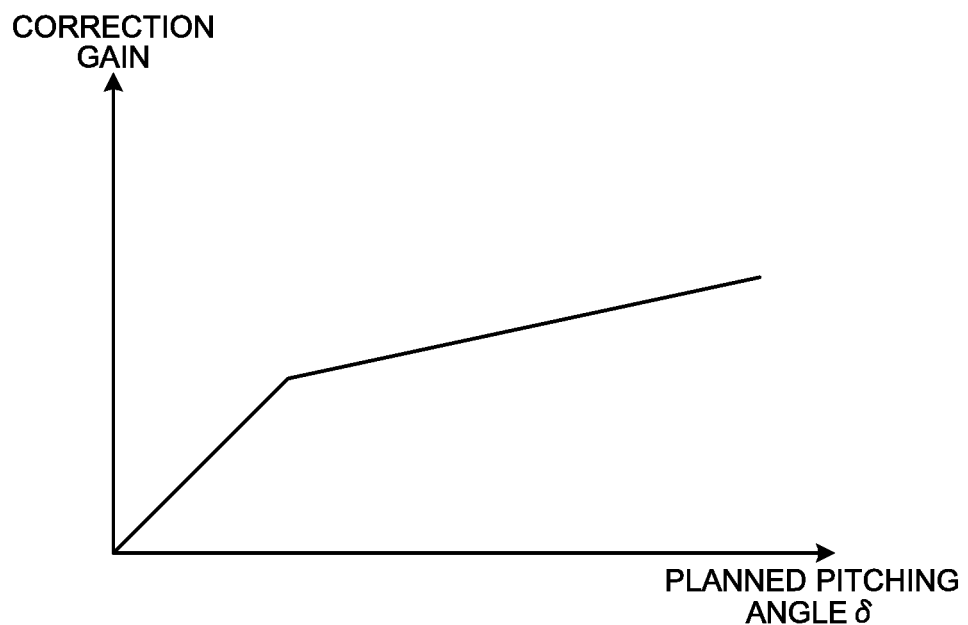
FIG. 8 is a diagram illustrating an estimation table according to the present embodiment.

FIG. 8 is a diagram illustrating the correction table according to the present embodiment. The correction table includes correlation data indicating a relationship between the planned pitching angle δ and a correction gain to be given to the corrected target height variation. The correction table is predetermined by preliminary experiments or simulations in consideration of a delay of a cylinder speed due to a hydraulic pressure, and is stored in the corrected cylinder speed calculation unit 113. As illustrated in FIG. 8, the correction gain increases as the planned pitching angle δ is larger. The correction gain decreases as the planned pitching angle δ is smaller.

Based on the planned pitching angle δ calculated by the planned pitching angle calculation unit 103 and based on such a correction table as illustrated in FIG. 8, the corrected cylinder speed calculation unit 113 gives a correction gain, which corresponds to the planned pitching angle δ, to the corrected target height variation, and calculates the target cylinder speed correction value.

The addition unit 116 adds the target cylinder speed calculated by the target cylinder speed calculation unit 104 and the target cylinder speed correction value calculated by the corrected cylinder speed calculation unit 113 to each other, and calculates a corrected cylinder speed. The corrected cylinder speed shows a value higher than the target cylinder speed.

The lift cylinder 25 is hydraulically driven. Therefore, an actual cylinder speed of the lift cylinder 25 may be delayed with respect to the target cylinder speed. In order that the delay of the cylinder speed due to the hydraulic pressure is eliminated, the addition unit 116 corrects the target cylinder speed, and calculates the corrected cylinder speed.

Based on the corrected cylinder speed calculated by the addition unit 116, the control command output unit 114 outputs, to the control valve 28, a control command to control the height of the cutting edge 19P of the blade 19. The control command output from the control command output unit 114 is a control command to drive the lift cylinder 25 at the corrected cylinder speed. The control command output unit 114 outputs the control command to the control valve 28 so that the lift cylinder 25 is driven at the corrected cylinder speed. The control command output from the control command output unit 114 includes a current that controls the control valve 28.

[Blade Control Method]

Figure 9:
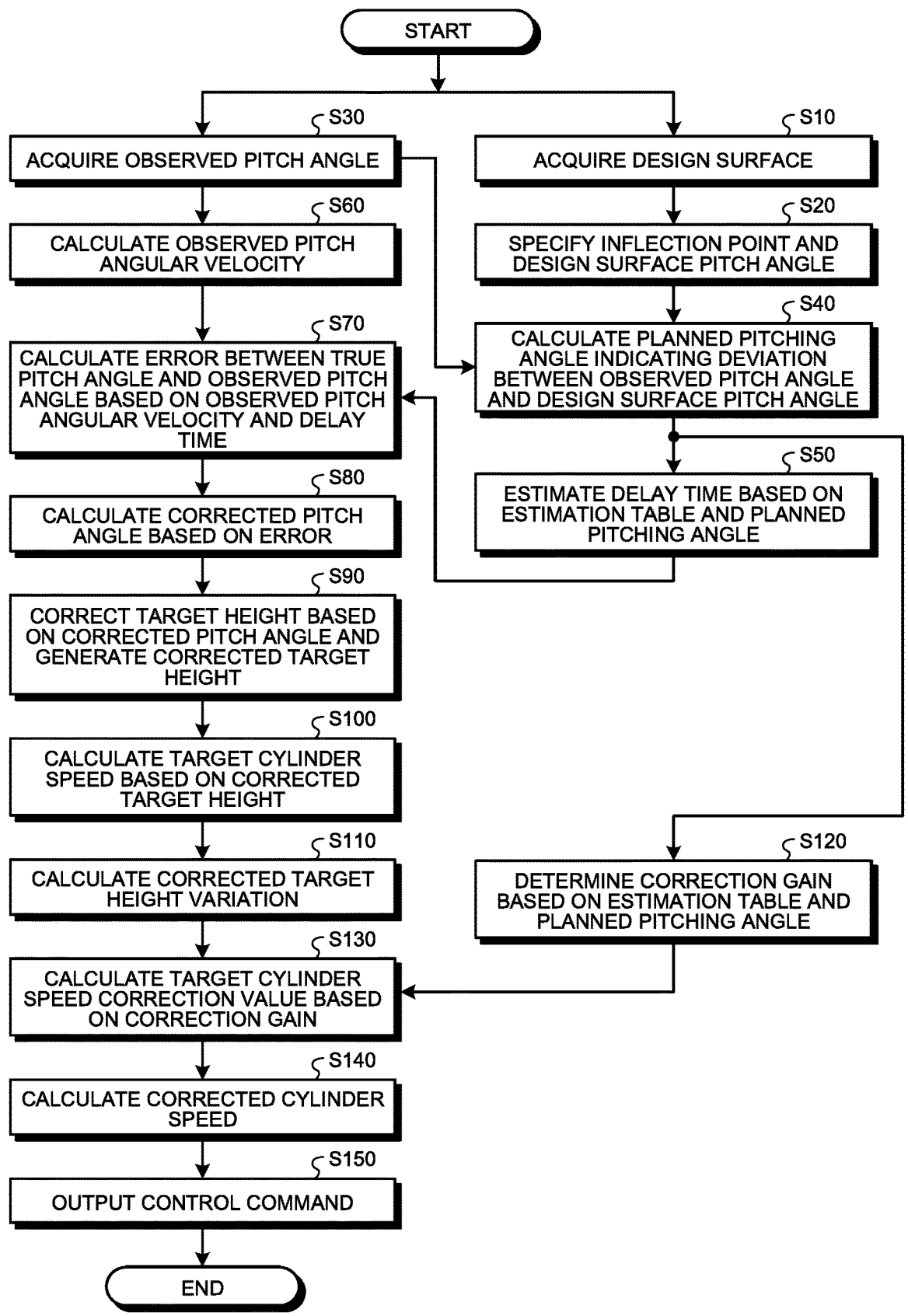
FIG. 9 is a flowchart illustrating a blade control method according to the present embodiment.

Next, a blade control method according to the present embodiment will be described. FIG. 9 is a flowchart illustrating the blade control method according to the present embodiment. Processing illustrated in FIG. 9 is performed in a specified cycle.

The design surface acquisition unit 101 acquires the design surface IS from the design surface data storage unit 31 (step S10). In the present embodiment, the design surface IS in a specified range in front of the work vehicle 1 (for example, 10 [m]) is transmitted from the target height generation device 30 to the blade control device 10 in a state in which the work vehicle 1 moves forward. The design surface acquisition unit 101 acquires the design surface IS in the specified range in front of the work vehicle 1 from the design surface data storage unit 31. In a specified cycle, the design surface acquisition unit 101 acquires the design surface IS in the specified range in front of the work vehicle 1, the specified range changing as the work vehicle 1 moves forward.

The inflection position search unit 102 specifies the inflection position CP indicating the boundary between the first surface F1 and the second surface F2 in the design surface IS acquired by the design surface acquisition unit 101. Further, the inflection position search unit 102 specifies the design surface pitch angle β of the second surface F2 (step S20).

The vehicle body angle acquisition unit 106 acquires the vehicle body angle data including the observed pitch angle PA (step S30).

The planned pitching angle calculation unit 103 calculates the planned pitching angle δ, which indicates the deviation between the observed pitch angle PA of the vehicle body 2 and the design surface pitch angle β of the second surface F2, in the state in which at least a part of the vehicle body 2 is positioned on the first surface F1 and the blade 19 is positioned above the second surface F2 (step S40).

The corrected pitch angle calculation unit 111 estimates the delay time of the observed pitch angle PA with respect to the true pitch angle PAr based on the planned pitching angle δ calculated by the planned pitching angle calculation unit 103 and the estimation table stored in advance (step S50).

The corrected pitch angle calculation unit 111 differentiates the observed pitch angle PA, and calculates the observed pitch angular velocity PAv (step S60).

The corrected pitch angle calculation unit 111 calculates the error between the true pitch angle PAr and the observed pitch angle PA based on the observed pitch angular velocity PAv calculated in step S60 and the delay time estimated in step S50 (step S70). The corrected pitch angle calculation unit 111 calculates the true pitch angle PAr by multiplying the observed pitch angular velocity PAv and the delay time by each other, and calculates the error between the true pitch angle PAr and the observed pitch angle PA.

The corrected pitch angle calculation unit 111 calculates the corrected pitch angle PAc based on the error calculated in step S70 and the observed pitch angle PA (step S80). The corrected pitch angle calculation unit 111 calculates the corrected pitch angle PAc by adding the error calculated in step S70 to the observed pitch angle PA. The corrected pitch angle PAc corresponds to the true pitch angle PAr.

Based on the corrected pitch angle PAc calculated in step S80, the target height correction unit 112 corrects the target height of the cutting edge 19P, which is acquired by the target height acquisition unit 110, and generates the corrected target height (step S90). That is, in order that the cutting edge 19P matches the second surface F2 when the vehicle body 2 is inclined at the corrected pitch angle PAc, the target height correction unit 112 corrects the target height, and generates the corrected target height.

Based on the corrected target height, the target cylinder speed calculation unit 104 calculates the target cylinder speed for controlling the height of the blade 19 (step S100). The target cylinder speed calculation unit 104 calculates the target cylinder speed based on the corrected target height so that the cutting edge 19P matches the second surface F2.

The differentiation unit 115 calculates the corrected target height variation based on the corrected target height (step S110).

The corrected cylinder speed calculation unit 113 determines the correction gain for the corrected target height variation based on the correction table and the planned pitching angle δ (step S120).

The corrected cylinder speed calculation unit 113 calculates the target cylinder speed correction value based on the correction gain determined in step S120 (step S130). The corrected cylinder speed calculation unit 113 multiplies the correction gain determined in step S120 and the corrected target height variation calculated in step S110 by each other, and calculates the target cylinder speed correction value.

The addition unit 116 adds the target cylinder speed and the target cylinder speed correction value to each other, and calculates the corrected cylinder speed (step S140).

The control command output unit 114 generates the control command based on the corrected cylinder speed calculated in step S140, and outputs the generated control command to the control valve 28 (step S150).

[Functions]

Figure 10:
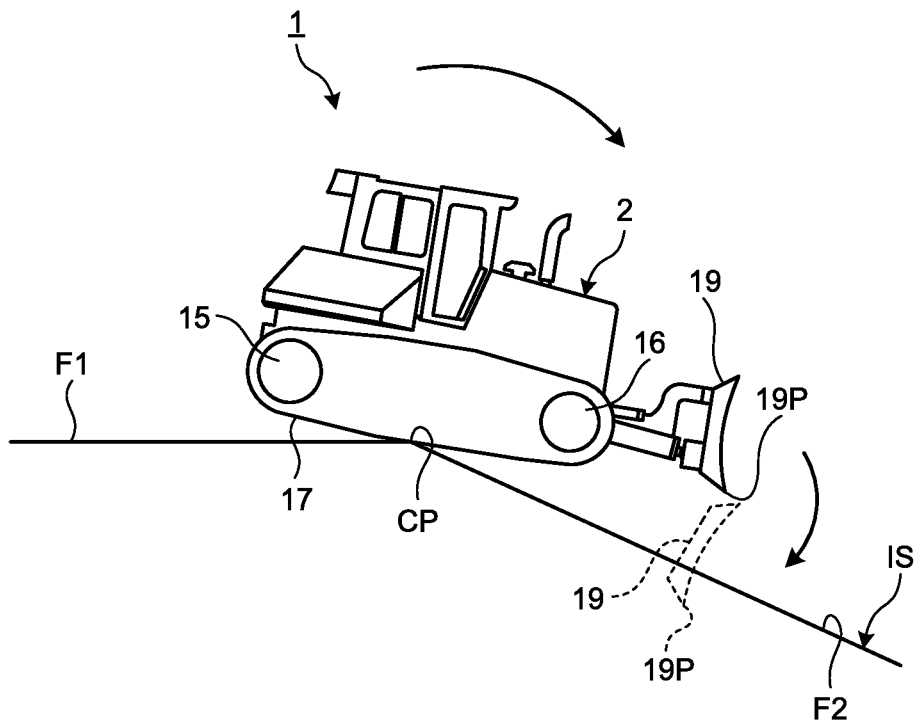
FIG. 10 is a view schematically illustrating an operation of a work vehicle according to a comparative example.

FIG. 10 is a view schematically illustrating an operation of a work vehicle 1 according to a comparative example. For example, when the work vehicle 1 moves forward along the first surface F1 and the center-of-gravity projection point of the work vehicle 1 passes the inflection position CP, the posture of the vehicle body 2 may be changed so as to fall forward by the action of gravity until the ground contact surface of the crawler belt 17 contacts the second surface F2.

When the control delay of the blade 19 occurs when the vehicle body 2 falls forward, the blade 19 may fail to follow the design surface IS. Since the position and moving speed of the blade 19 are hydraulically controlled, the control delay may occur. Further, the control delay may occur, for example, due to various data transmission delays from the target height generation device 30 to the blade control device 10, various computation delays in the target height generation device 30, various computation delays in the blade control device 10, and the like. When the control delay of the blade 19 occurs, as illustrated in FIG. 10, the blade 19 excavates the excavation object in a state in which the cutting edge 19P goes below the second surface F2 of the design surface IS, and the excavation object may not be excavated into a desired shape.

Figure 11:
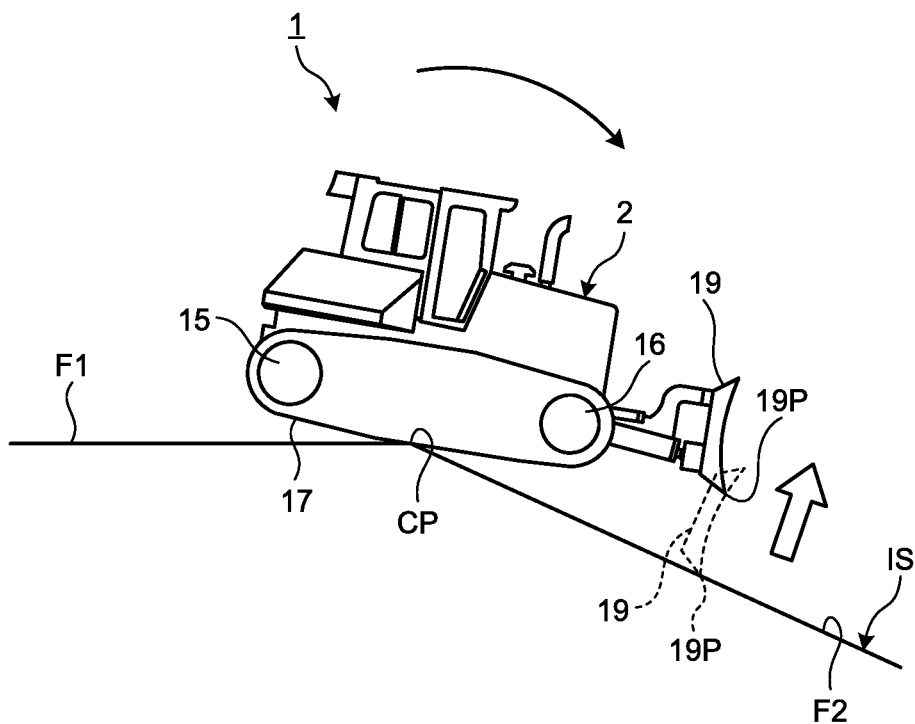
FIG. 11 is a diagram schematically illustrating an operation of the work vehicle according to the present embodiment.

FIG. 11 is a view schematically illustrating an operation of the work vehicle 1 according to the present embodiment. In the present embodiment, the planned pitching angle δ is calculated, the observed pitch angle PA is corrected based on the planned pitching angle δ, and the corrected pitch angle PAc is calculated. Even if there occurs the transmission delay of the observed pitch angle data from the target height generation device 30 to the blade control device 10, a delay time of the transmission of the observed pitch angle data is estimated based on the estimation table and the planned pitching angle S. The delay time is estimated, whereby the corrected pitch angle calculation unit 111 can calculate the corrected pitch angle PAc corresponding to the true pitch angle PAr.

Moreover, even if there occurs the delay in computation of the target height of the cutting edge 19P by the target height calculation unit 34, and there occurs the delay in transmission of the target height data, which indicates the target height, from the target height generation device 30 to the blade control device 10, then based on the corrected pitch angle PAc, the target height correction unit 112 can correct the target height of the cutting edge 19P so as to eliminate such a computation delay or a transmission delay, and can generate the corrected target height.

The target cylinder speed calculation unit 104 calculates the target cylinder speed based on the corrected target height calculated so as to eliminate the control delay. The corrected target height is set to a position higher than the target height. Accordingly, even if the control delay of the blade 19 occurs, the blade 19 is controlled so that the cutting edge 19P follows the second surface F2, and the cutting edge 19P is inhibited from moving below the second surface F2. Hence, the excavation object is inhibited from being excavated deeply.

Since the blade 19 is hydraulically driven, the control delay due to hydraulic responsiveness may occur. In the present embodiment, the target cylinder speed is corrected based on the planned pitching angle δ, and the corrected cylinder speed is calculated. Even if the control delay due to the hydraulic response occurs, the corrected cylinder speed is calculated based on the correction table and the planned pitching angle δ so that the control delay due to the hydraulic pressure is eliminated. The corrected cylinder speed is set to a value higher than the target cylinder speed. Accordingly, even if the control delay of the blade 19 occurs, the blade 19 is controlled so that the cutting edge 19P follows the second surface F2, and the cutting edge 19P is inhibited from moving below the second surface F2. Hence, the excavation object is suppressed from being excavated deeply.

[Computer System]

Figure 12:
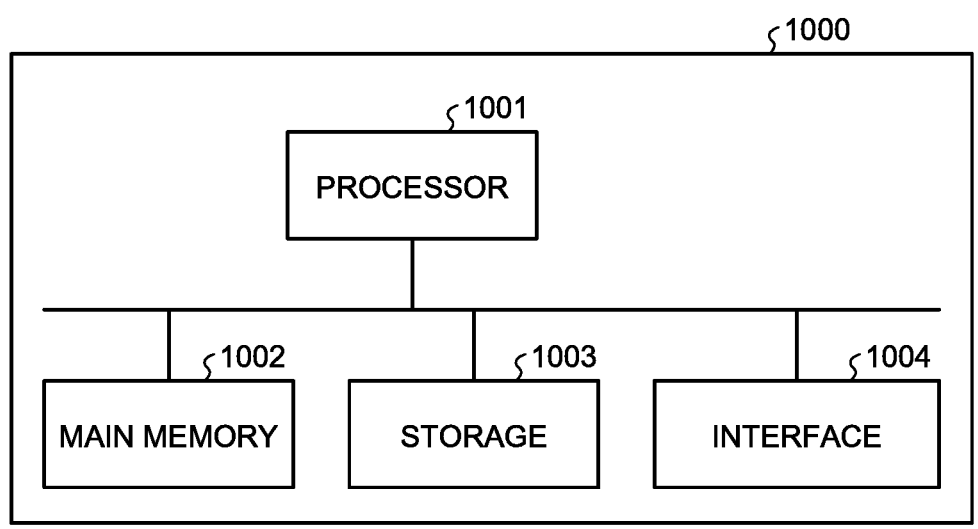
FIG. 12 is a block diagram illustrating a computer system according to the present embodiment.

FIG. 12 is a block diagram illustrating a computer system 1000 according to the present embodiment. Each of the above-mentioned blade control device 10 and target height generation device 30 includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. Functions of the above-mentioned blade control device 10 and functions of the above-mentioned target height generation device 30 are stored as a program in the storage 1003. The processor 1001 reads the program from the storage 1003, expands the program in the main memory 1002, and executes the above-mentioned processing according to the program. The program may be delivered to the computer system 1000 via a network.

[Effects]

As described above, according to the present embodiment, the corrected pitch angle PAc is calculated based on the planned pitching angle $\delta$, and the target cylinder speed of the lift cylinder 25 that adjusts the height of the blade 19 based on the corrected pitch angle PAc is calculated. Thus, the blade 19 is controlled so that the cutting edge 19P follows the design surface IS even in a situation where the data transmission delay or the computation delay may occur. Hence, the excavation object is suppressed from being excavated deeply, and the excavation object is excavated into a desired shape.

Moreover, in the present embodiment, the target cylinder speed is corrected based on the planned pitching angle $\delta$ to calculate the corrected cylinder speed, and the control command is output so that the lift cylinder 25 is driven at the corrected cylinder speed. Thus, the blade 19 is controlled so that the cutting edge 19P follows the design surface IS even in a situation where the control delay due to the hydraulic pressure may occur. Hence, the excavation object is suppressed from being excavated deeply, and the excavation object is excavated into a desired shape.

OTHER EMBODIMENTS

In the above-described embodiment, as illustrated in FIG. 5, the first surface F1 and the second surface F2, which are present in front of the work vehicle 1, have down slopes. The first surface F1 and the second surface F2, which are present in front of the work vehicle 1, may have up slopes. When the first surface F1 and the second surface F2 have up slopes, the inclination angle $\alpha$ of the first surface F1 with respect to the horizontal plane is larger than the inclination angle $\beta$ of the second surface F2 with respect to the horizontal plane. Even when the first surface F1 and the second surface F2 have up slopes, the blade 19 is controlled according to the above-mentioned embodiment, whereby the excavation object is excavated into a desired shape.

In the above-mentioned embodiment, the example in which the work vehicle 1 is a bulldozer has been described. The work vehicle 1 may be a motor grader having a blade.

REFERENCE SIGNS LIST

1 WORK VEHICLE
2 VEHICLE BODY
3 TRAVEL DEVICE
4 WORKING EQUIPMENT
5 HYDRAULIC CYLINDER
6 POSITION SENSOR
7 INCLINATION SENSOR
8 SPEED SENSOR
9 OPERATION AMOUNT SENSOR
10 BLADE CONTROL DEVICE
11 OPERATOR'S CAB
12 ENGINE COMPARTMENT
13 SEAT
14 OPERATION DEVICE
15 DRIVE WHEEL
16 IDLER WHEEL
17 CRAWLER BELT
18 LIFT FRAME
19 BLADE
19P CUTTING EDGE
20 BALL JOINT PORTION
21 PITCH SUPPORT LINK
22 SUPPORT PORTION
23 UNIVERSAL JOINT
24 PITCHING JOINT
25 LIFT CYLINDER
26 ANGLE CYLINDER
27 TILT CYLINDER
28 CONTROL VALVE
30 TARGET HEIGHT GENERATION DEVICE
31 DESIGN SURFACE DATA STORAGE UNIT
32 VEHICLE DATA STORAGE UNIT
33 DATA ACQUISITION UNIT
34 TARGET HEIGHT CALCULATION UNIT
101 DESIGN SURFACE ACQUISITION UNIT
102 INFLECTION POSITION SEARCH UNIT
103 PLANNED PITCHING ANGLE CALCULATION UNIT
104 TARGET CYLINDER SPEED CALCULATION UNIT
105 VEHICLE BODY POSITION ACQUISITION UNIT
106 VEHICLE BODY ANGLE ACQUISITION UNIT
107 OPERATION AMOUNT ACQUISITION UNIT
108 VEHICLE DATA ACQUISITION UNIT
109 ACTUAL HEIGHT CALCULATION UNIT
110 TARGET HEIGHT ACQUISITION UNIT
111 CORRECTED PITCH ANGLE CALCULATION UNIT
112 TARGET HEIGHT CORRECTION UNIT
113 CORRECTED CYLINDER SPEED CALCULATION UNIT
114 CONTROL COMMAND OUTPUT UNIT
115 DIFFERENTIATION UNIT
116 ADDITION UNIT
AX ROTATION AXIS
BX ROTATION AXIS
CX ROTATION AXIS
F1 FIRST SURFACE
F2 SECOND SURFACE
IS DESIGN SURFACE
L STROKE LENGTH
PA OBSERVED PITCH ANGLE
$\alpha$ INCLINATION ANGLE
$\beta$ INCLINATION ANGLE (DESIGN SURFACE PITCH ANGLE)
$\theta$ LIFT ANGLE

The invention claimed is:
1. A blade control device comprising:
a processor configured to perform the following:
acquiring a design surface indicating a target shape of an excavation object to be excavated by a blade supported by a vehicle body of a work vehicle, the design surface including a first surface present in front of the work vehicle and a second surface having a slope different from a slope of the first surface;

acquiring an observed pitch angle indicating an inclination angle of the vehicle body in a longitudinal direction;

in a state in which at least a part of the vehicle body is positioned on the first surface and the blade is positioned above the second surface, calculating a planned pitching angle indicating a deviation between the observed pitch angle and a design surface pitch angle indicating an inclination angle of the second surface;

correcting the observed pitch angle based on the planned pitching angle and calculating a corrected pitch angle of the vehicle body;

acquiring a target height of the blade, the target height being calculated based on the design surface;

correcting the target height based on the corrected pitch angle, and generating a corrected target height, based on the corrected pitch angle, calculating a target cylinder speed of a hydraulic cylinder that adjusts a height of the blade, calculating a corrected target height variation based on the corrected target height, calculating a target cylinder speed correction value based on the planned pitching angle and the corrected target height variation, and determining a correction gain for the corrected target height variation based on a correction table and the planned pitching angle, wherein the correction table includes correlation data indicating a relationship between the planned pitching angle and the correction gain to be given to the corrected target height variation.

2. The blade control device according to claim 1, further comprising the following steps performed by the processor:

searching for an inflection position indicating a boundary between the first surface and the second surface on the design surface; and calculating the planned pitching angle based on the inflection position.

3. The blade control device according to claim 1, further comprising the following steps performed by the processor:

acquiring a position of the vehicle body;

acquiring an operation amount of the hydraulic cylinder;

calculating the height of the blade based on the position of the vehicle body, the inclination angle of the vehicle body, and the operation amount of the hydraulic cylinder; and calculating the target cylinder speed such that a deviation between a height of a cutting edge of the blade and the corrected target height becomes small.

4. The blade control device according to claim 3, further comprising the following steps performed by the processor:

calculating the target cylinder speed based on the corrected target height;

adding the target cylinder speed and the target cylinder speed correction value to each other and calculates a corrected cylinder speed; and outputting a control command to control the height of the blade based on the corrected cylinder speed.

5. The blade control device according to claim 1, wherein an angle formed by the first surface and the second surface is larger than 180[°] on the design surface.

6. A blade control method comprising:

acquiring a design surface indicating a target shape of an excavation object to be excavated by a blade supported by a vehicle body of a work vehicle, the design surface including a first surface present in front of the work vehicle and a second surface having a slope different from a slope of the first surface;

acquiring an observed pitch angle indicating an inclination angle of the vehicle body in a longitudinal direction;

calculating a planned pitching angle indicating a deviation between the observed pitch angle and a design surface pitch angle indicating an inclination angle of the second surface in a state in which the vehicle body is positioned on the first surface and the blade is positioned above the second surface;

correcting the observed pitch angle based on the planned pitching angle and calculating a corrected pitch angle of the vehicle body;

acquiring a target height of the blade, the target height being calculated based on the design surface;

correcting the target height based on the corrected pitch angle, and generating a corrected target height;

calculating a target cylinder speed of a hydraulic cylinder that adjusts a height of the blade, based on the corrected pitch angle;

calculating a corrected target height variation based on the corrected target height;

calculating a target cylinder speed correction value based on the planned pitching angle and the corrected target height variation; and determining a correction gain for the corrected target height variation based on a correction table and the planned pitching angle;

wherein the correction table includes correlation data indicating a relationship between the planned pitching angle and the correction gain to be given to the corrected target height variation.

* * * * *